United States Patent [19]
Lynam et al.

[11] Patent Number: 5,148,014
[45] Date of Patent: Sep. 15, 1992

[54] MIRROR SYSTEM WITH REMOTELY ACTUATED CONTINUOUSLY VARIABLE REFLECTANT MIRRORS

[75] Inventors: Niall R. Lynam; Dale M. Roberts, both of Holland, Mich.

[73] Assignee: Donnelly Corporation, Holland, Mich.

[21] Appl. No.: 615,228

[22] Filed: Nov. 19, 1990

Related U.S. Application Data

[63] Continuation-in-part of Ser. No. 565,652, Aug. 10, 1990, Pat. No. 5,122,647.

[51] Int. Cl.⁵ ............................................. H01J 40/14
[52] U.S. Cl. ............................... 250/214 AL; 359/602
[58] Field of Search ......... 250/214 AL, 201.1, 214 R; 350/279; 359/602-604, 38, 85, 872, 873

[56] References Cited

U.S. PATENT DOCUMENTS

| | | | |
|---|---|---|---|
| 3,451,741 | 6/1969 | Manos | 252/62.2 |
| 3,521,941 | 7/1970 | Deb et al. | 340/335 |
| 3,578,843 | 5/1971 | Castellion | 350/160 R |
| 3,690,508 | 9/1987 | Jacob | 350/332 |
| 3,708,220 | 1/1973 | Meyers et al. | 350/160 R |
| 3,774,988 | 11/1973 | Rogers | 350/150 |
| 3,807,832 | 4/1974 | Castellion | 350/160 R |
| 3,862,798 | 1/1975 | Hopkins | 350/307 |
| 4,088,392 | 5/1978 | Meyers | 350/160 R |
| 4,161,653 | 7/1979 | Bedini et al. | 350/331 |
| 4,181,406 | 1/1980 | Kohara et al. | 350/357 |
| 4,201,451 | 5/1980 | Jacob | 350/278 |
| 4,293,194 | 10/1981 | Takahashi | 350/357 |
| 4,298,870 | 11/1981 | Saegusa | 350/357 |
| 4,299,444 | 11/1981 | Romer | 350/278 |
| 4,309,082 | 1/1982 | Kohara et al. | 350/357 |
| 4,512,637 | 4/1985 | Ballmer | 350/357 |
| 4,529,275 | 7/1985 | Ballmer | 350/357 |
| 4,529,873 | 7/1985 | Ballmer et al. | 350/357 |
| 4,623,222 | 11/1986 | Itoh et al. | 350/331 T |
| 4,634,835 | 1/1987 | Suzuki | 219/219 |
| 4,655,549 | 4/1987 | Suzuki et al. | 350/331 R |
| 4,671,615 | 6/1987 | Fukada et al. | 359/30 |
| 4,676,601 | 6/1987 | Itoh et al. | 350/331 R |
| 4,693,558 | 9/1987 | Nakaho et al. | 350/332 |
| 4,701,022 | 10/1987 | Jacob | 350/279 |
| 4,741,603 | 5/1988 | Miyagi et al. | 350/357 |
| 4,762,401 | 8/1988 | Baucke et al. | 350/357 |
| 4,781,436 | 11/1988 | Armbruster | 350/281 |
| 4,792,220 | 12/1988 | Janowicz | 350/637 |
| 4,793,690 | 12/1988 | Gahan et al. | 250/214 D |
| 4,824,221 | 4/1989 | Endo et al. | 359/274 |
| 4,828,361 | 5/1989 | Alten et al. | 350/279 |
| 4,832,467 | 5/1989 | Miyagi | 350/357 |
| 4,838,650 | 6/1989 | Stewart et al. | 350/280 |
| 4,878,743 | 11/1989 | Aikawa et al. | 350/357 |
| 4,886,960 | 12/1989 | Molyneux et al. | 250/214 AL |
| 4,896,030 | 1/1990 | Miyaji | 350/357 |
| 4,917,477 | 4/1990 | Bechtel et al. | 350/357 |

FOREIGN PATENT DOCUMENTS

| | | |
|---|---|---|
| 0304198 | 2/1989 | European Pat. Off. |
| 57-173801 | 10/1982 | Japan |
| 57-208530 | 12/1982 | Japan |
| 57-208531 | 12/1982 | Japan |
| 60-139545 | 7/1985 | Japan |
| 61-54942 | 4/1986 | Japan |
| 2156545 | 10/1985 | United Kingdom |
| 2192600 | 1/1988 | United Kingdom |

OTHER PUBLICATIONS

Schott bulletin pp. 11-17, No. 1/1983-English, De Friedrich G. K. Baucke.

*Primary Examiner*—David C. Nelms
*Assistant Examiner*—S. Allen
*Attorney, Agent, or Firm*—Price, Heneveld, Cooper, DeWitt & Litton

[57] ABSTRACT

A light transmitting system for a vehicle includes a window or mirror with variable transmittance. A first input device, which may comprise a user adjustable device or an ambient light sensor, provides a comfort setting. A second input device, which overrides the first, may be operated manually, or by the vehicle engaging reverse gear or switching on headlights, to increase or decrease the reflectivity and transmittance of mirror and window embodiments respectively. Where a mirror is used, a third input device, which may comprise a photosensor, may be actuated to provide lower reflectivity when experiencing glare.

79 Claims, 6 Drawing Sheets

MIRROR SYSTEM WITH REMOTELY ACTUATED CONTINUOUSLY VARIABLE REFLECTANT MIRRORS

CROSS REFERENCE TO RELATED APPLICATIONS

This patent application is a continuation-in-part of U.S. patent application Ser. No. 07/565,652 filed Aug. 10, 1990 by Niall R. Lynam and Dale M. Roberts, now U.S. Pat. No. 5,122,647.

BACKGROUND OF THE INVENTION

This invention relates generally to mirror systems for vehicles and more particularly to such mirror systems having controls for adjustment of the reflectance level of one or more mirrors The invention is especially adapted to mirror systems utilizing continuously variable reflectance elements such as electrochromic elements Automatic rearview mirrors which sense glare-producing light and ambient light conditions and which automatically control the reflectivity level of the mirror have become sophisticated in establishing an optimum reflectivity level. Examples of such systems are included in U.S. Pat. No. 4,793,690 to Edward A. Gahan et al. for a REARVIEW MIRROR CONTROL CIRCUIT, and U.S. Pat. No. 4,886,960 to Keith W. Molyneux et al. for a CONTROL CIRCUIT FOR AN AUTOMATIC REARVIEW MIRROR. Such systems typically provide a manual sensitivity adjustment The control then automatically establishes the reflectivity of the reflectance element based upon the sensed level of ambient light and glare-producing light, as well as the sensitivity level selected by the driver While such automatic controls are very satisfactory for many automotive applications, especially for automobiles and small trucks, they are not necessarily desirable for all applications. A rearview mirror can serve two functions The first is "dimensional" in that the driver bases distance/dimension decisions on the reflected image. The second function is providing awareness to the driver of vehicles immediately adjacent in side-lanes or to the rear. In an automobile, the interior mirror, and to a lesser extent, the driver-side outside mirror, serve both the dimensional and awareness functions. The passenger-side mirror in an automobile, which is typically convex, is principally an awareness device. By contrast, the outside mirrors on large commercial vehicles, such as trucks and buses, equally function as dimensional and awareness devices. Indeed, a truck driver's skill is significantly determined by the ability to use the outside mirrors, especially for dimensional/distance decisions. Thus, automatically controlled mirrors have disadvantages for, and are somewhat disagreeable to, truck drivers who both desire and require user-control over the reflectivity of any variable reflectance mirrors mounted on their vehicle. Thus, manually controlled (otherwise known a remote-controlled or user-controlled mirrors), which provide control by the driver over the mirror reflectivity, are particularly desirable to truck drivers. The driver desires to manually select the level of reflectivity for the mirror most appropriate for the truck driving task. Such reflectivity depends on the ambient lighting conditions, on the level of both headlamp glare, and, surprisingly, sunlight glare experienced, and on whether the driver is reversing or turning a corner.

Truck drivers in particular, but all drivers in general, even by day, benefit from a variable reflectance mirror capable of high, moderate and low reflectance levels. Within this context, high reflectivity is a mirror reflectance level that approaches, as close as is practical, to the 90% (as measured using test method SAE J964a, Society of Automotive Engineers, Warrendale, Pa.), or thereabouts, which equals the reflectance level conventionally provided by second-surface silvered mirrors Car drivers, particularly in the Unite States, have for decades opted to use exterior rearview mirrors that use as their reflector element a thin film of chromium metal and achieve thereby a reflectance level of 55%+/−5%, or thereabouts, which is considered moderate in reflectance level. Such a chromium mirror offers a compromise between daytime visibility and nighttime glare protection. Truck drivers, in general, and many European car drivers, have continued to favor silvered, high reflectance exterior mirrors. They apparently do so because they particularly value the extra rear vision performance of such high reflectance mirrors and are willing to suffer the excessive glare reflected by said high reflectance mirrors. Thus, many drivers desire a high reflectance mirror with a reflectivity of at least 60% desired, and greater than 70% preferred, but with the capability to vary the reflectivity of said mirror so that a high reflectance can be selected when appropriate and a lower, dimmed reflectance can be selected when appropriate.

Large trucks typically do not have an interior mirror. While vans and other commercial vehicles may have interior mirrors, the view afforded by such interior mirrors is limited at best. Truck drivers and other professional drivers use their outside mirrors as a primary driving aid and, as such, use and depend upon their mirrors to a much greater extent than do ordinary drivers. Because of the primary importance served by the rearview mirrors to professional drivers, such drivers desire greater personal control over operation of the mirror. Mirror glare is an especially severe problem for professional drivers who drive for long periods and are more likely to be driving during nighttime hours. Furthermore, the large size of truck mirrors increases the amount of glare that may be reflected into the eyes of the driver. Such glare creates eye fatigue which adds to the overall fatigue experienced during long trips. Therefore, what may be a mere annoyance to a casual driver, may be a safety problem for the professional driver.

In addition to their use in long-haul situations, rearview mirrors for trucks play a critical role in ensuring that the driver has adequate awareness and cognizance of traffic conditions rearward and in adjacent lanes when making lane-change decisions. The field of view and clarity of image and reflectance level must be such that the driver can quickly and easily determine traffic condition in all weather conditions, day or night. The vehicle's rearview mirrors must provide an image which is bright enough for the driver to quickly and easily gather information concerning vehicles, pedestrians and cyclists even in low light level conditions. On the other hand, the mirror must not present an image that is so bright that it causes glare or produces fatigue.

When reversing into loading docks and the like, truck drivers require their mirrors for maneuvering and require a high level of reflectivity so that the driver can clearly discern what is happening on both sides of the vehicle even under severe conditions. For example, the driver may be reversing the truck from the bright outdoors to a typically darker loading dock bay. In addition to reversing into loading dock bays, truck drivers must use their rearview mirrors when making turns. Class 8 truck drivers drive vehicles making wide-angle turns and the driver must frequently use, and depend for decision making upon, the exterior rearview mirrors. Indeed, when the vehicle is equipped with more than one variable reflectance mirror, the driver may desire that only one of a particular combination of mirrors in the system rapidly return to the high reflectance state while the remainder of the mirrors continue in their dimmed state. Likewise, when turning from a heavy-traffic road onto a low-traffic road, having a lower level of ambient light, the driver may desire that, upon selection, the mirror(s) be capable of rapidly returning to the highest reflectance state achievable Whereas it may be acceptable that the mirror dim under manual control to a low reflectance state over a period as long as several tens of seconds, it is desirable that the mirror return to high reflectivity more rapidly and be accomplished in a matter of a few seconds, and preferably one to three seconds. Therefore, it is important that the time taken to return from a significantly dimmed reflectance level to a high reflectance level (which is the rate of bleaching) be rapid. Accordingly, mirror systems for large trucks must allow the driver to respond to a number of critical situations. In many such situations, speed of response is critical.

Non-professional drivers also often desire greater user control over the reflectance level of the mirrors. Remotely actuated mirrors have been provided which allow the driver to actuate a two-state, prism-type miror between states. While such remotely actuated mirrors put control of the mirror in the hands of the driver, they do little more than duplicate the manual flipping of a conventional mechanical rearview mirror.

SUMMARY OF THE INVENTION

The present invention provides a vehicular mirror system that puts a premium on driver comfort and control. Control over the reflectance level of the mirror is provided to the driver in a manner that is rational and therefore natural to use. The invention provides a high level of visibility in the mirrors consistent with the driver's comfort level while providing exceptional glare protection.

The present invention is embodied in a rearview mirror system for a vehicle having a variable reflective element, with a reflectivity level that is continuously variable, and level setting means for setting the reflectivity level of the reflective element at a comfort value. According to one aspect of the invention, a second input device is provided for setting a reflectivity level of the reflective element that is greater than the comfort level and which selectively overrides the comfort value selected by the user. The reflective element is preferably chosen in order to achieve the higher level of reflectivity in a time period that is shorter than the period of time taken by the reflective element to decrease in reflectance from the higher reflectance level to the lower, comfort reflectance level in order to allow the mirror to rapidly achieve a high reflectivity value when required.

According to another aspect of the invention, the level setting means for setting the reflectivity level of the reflective element at a comfort value may be combined with an override means that is responsive to selective actuation upon a glare condition in order to set the reflectance level of the reflective element at an override value that is lower than the set comfort value, and a second override means is provided that is responsive to selective actuation to set the reflectance level of the reflective element at an override value that is higher than either the set comfort value or the lower value. When the high-reflectance state is no longer required, means are provided to return the reflectance value to that which existed prior to actuation of the second override means The invention may be embodied in a mirror system having more than one mirror. If more than one mirror is provided, the desired reflectance values of all mirrors may be individually set with separate level setting means or may be jointly set by a common level setting means. The override of the mirrors may be accomplished jointly with a single actuatable means or individually with separate actuatable means. Such a mirror system may additionally include one or more mirrors which are automatically controlled in a more conventional manner.

In a preferred embodiment, an all solid-state electrochromic mirror is combined with circuitry that allows selection of a comfort value of reflectance that lies within the range of reflectances of the continuously variable reflective element. An override means is provided that, upon user selection, causes a rapid return of the reflectance level to a high reflectance state and, upon deactivation, causes the mirror reflectance to resume the prior comfort value. Such mirror has a speed of bleaching that is greater than its speed of coloration. This is useful because it facilitates a very rapid increase in mirror reflectance when the override is selected by the driver. Among variable reflectance mirror constructions proposed in prior art, many have the property that their rate of bleaching is slower than their rate of coloration. Such is the case for electrochromic devices as described in the article "Electrochromic Devices for Transmissive and Reflective Light Control" by Kamimori et al., Proceedings of SPIE, 653, 2-9, (1986). Some, such as described in U.S. Pat. No. 4,465,339, have a rate of bleaching that is equal to the rate of coloration. Such electrochromic mirrors would still benefit from the broader aspects of the circuitry of this invention. However, the present invention encompasses an electrochromic mirror design whose performance is particularly suited for manual operation. The desire of drivers, particularly professional drivers, to have, on demand, a rapid return to a high reflectance state, is best met by the combination of the specialized circuitry of this invention with the disclosed electrochromic mirror construction, wherein the rate of bleach to a high reflectance state is more rapid than the rate of dimming.

More particularly, the present invention preferably includes an all solid-state electrochromic mirror of the type disclosed in U.S. Pat. No. 4,712,879 to Lynam et al., in which the rate of bleaching is more rapid than the rate of dimming. Such response is particularly well suited to the needs of drivers when operating variable reflectance mirrors in a manual mode. In this embodiment, glare override means may also be provided to allow, during periods of excessive glare, selection of an override value of reflectance that is lower in reflectance than the comfort value. The first override means, when activated, overrides both the comfort level and the second override means to cause a rapid bleaching of the mirror to a high reflectance level, and when deactivated, cause a resumption to the prior reflectance value established by the comfort value selection means or the glare override means.

A mirror system according to the invention may, additionally, be responsive to a reverse gear signal from the vehicle in order to activate the high reflectance level and may include means to cause the reflective element to achieve the high reflectance level when power is interrupted to the mirror system. A mirror system according to the invention may further be responsive to the headlight power switch of the vehicle, or an ambient light sensor, in order to dim the mirror to the preselected comfort reflectance level at dusk. The control circuit means may additionally include means responsive to the ambient light sensor in order to select the comfort level of the mirror in response to the ambient light level without requiring intervention by the user. An ambient light signal may be obtained from an ambient light sensor that is integral with the mirror system control or may be provided by a separate ambient sensor present elsewhere in the vehicle such as the ambient sensor commonly used on automatic rearview mirrors, or on the twilight sentinel control that actuates the vehicle light system at dusk or the like. The invention encompasses combinations of the above. For example, the mirror system according to this invention can be responsive to the headlight power switch in order to dim the mirror to the preselected comfort level stored in the memory means, but only if the ambient light sensor detects that it is dusk, or night. This allows the driver to operate the headlights, by day for highway driving and the like, without the rearview mirror dimming, unless otherwise selected. Memory means may be provided with the control circuit to store the comfort level when the ignition is turned off and retrieve that level when the ignition is again turned on. Additionally, comfort level preferences for individual drivers may be stored and retrieved selectively upon the entry of a personal identification code.

The principles of this invention are also applicable to window systems, such as automobile side windows and sunroofs. For example, it includes the concept of using the ambient sensor to set some comfort level but allowing overrides for selection of more intense coloration and/or full bleach applicable to windows as well as mirrors. For example, such a concept would be useful in an automotive sunroof. However, in window systems, the relationship between ambient light level and desired level of dimming is opposite to that for mirror systems. For a window system, a low transmitting, light attenuating level is desired during daytime in order to reduce solar transmission and consequent heat build-up. By night, the driver would prefer to have the full sunroof transmission to view the stars, etc., or, if the car had been parked at an airport, etc., it would be desirable for the ambient sensor, knowing it is not nighttime, to control the sunroof transmittance to be at its highest level so as to minimize battery drain by night when solar heating is not an issue. By day, the driver, when driving, might appreciate a "comfort" zone of moderate transmission, balancing the desire to realize a solar energy reduction benefit while driving with the desire to see the sky, etc. (which is why the driver originally chose a glass rather than an opaque, metal sunroof in the first instance). The driver could optionally benefit from a selective override that caused the sunroof to dim to its lowest state (and so provide relief from glare or localized heating when, for instance, the sun came out between clouds) or the driver could desire to control the sunroof to return to its highest transmission state to view something of particular interest therethrough.

These and other objects, advantages and features of this invention will become apparent upon review of the following specification in conjunction with the drawings.

DESCRIPTION OF THE PREFERRED EMBODIMENT

Figure 1A:
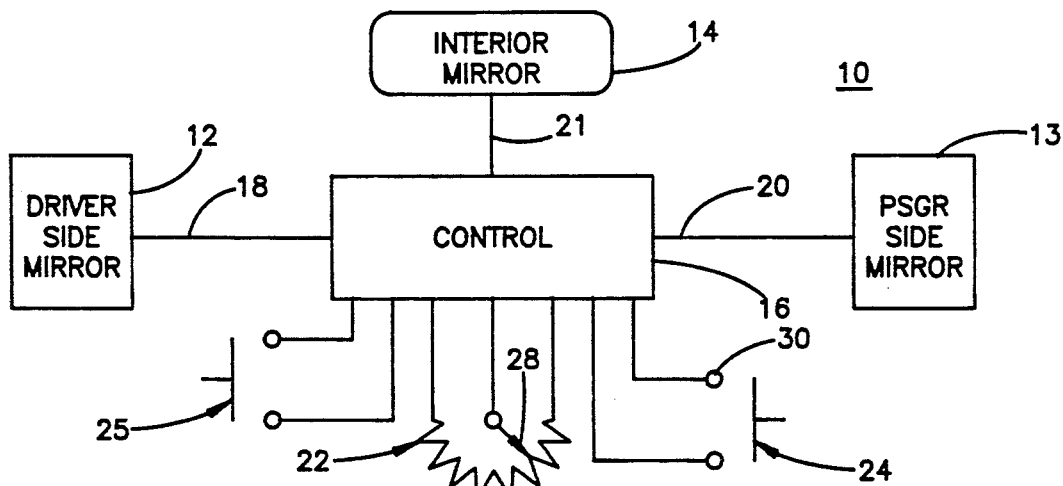
FIGS. 1A-1E are block diagrams of mirror systems according to the present invention.
Figure 1B:
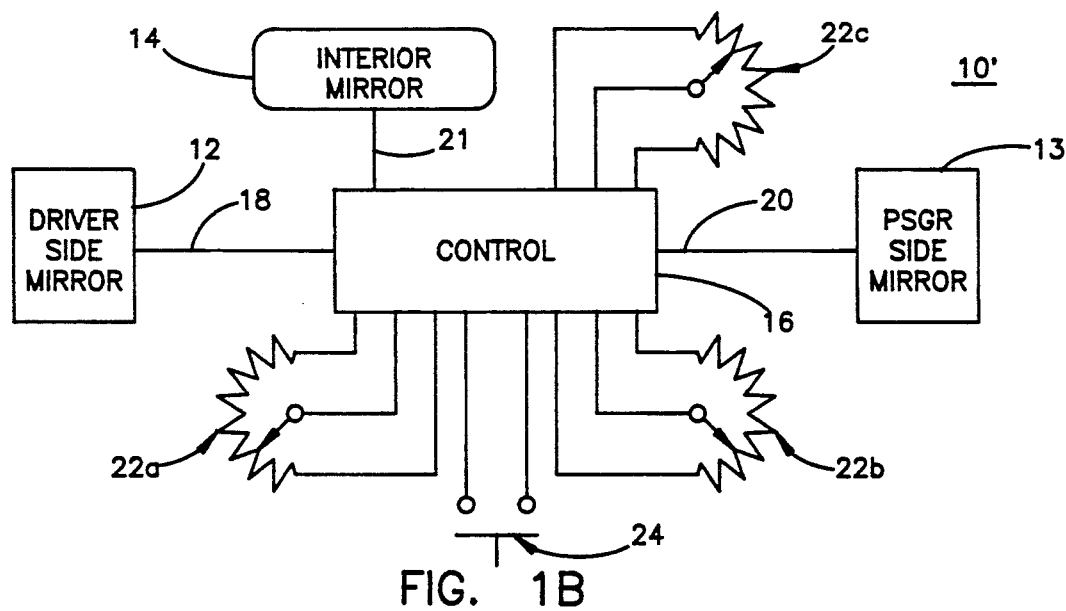
Figure 1C:
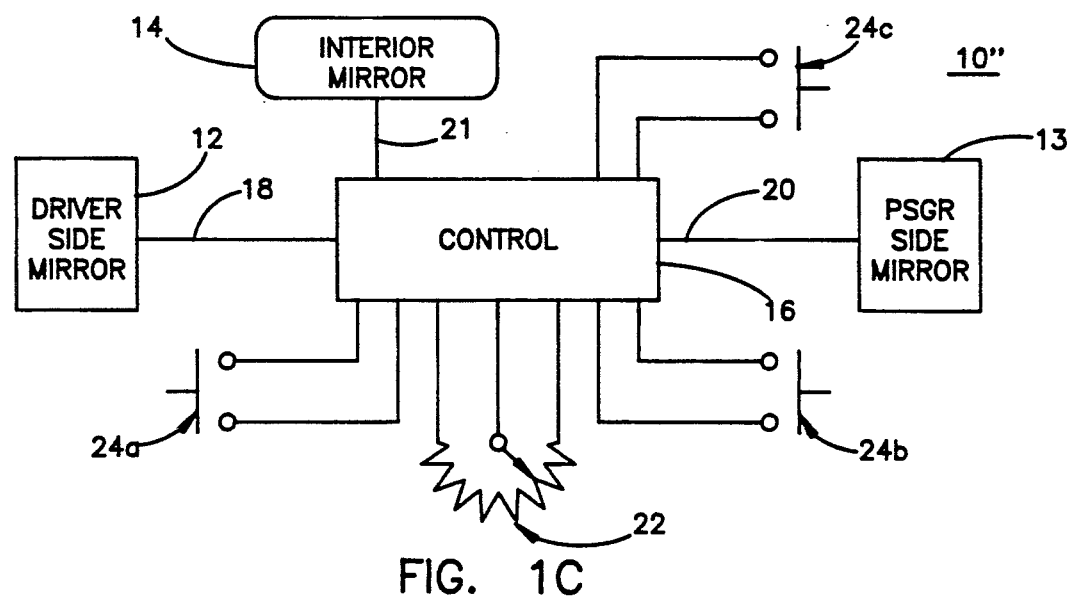

Referring now specifically to the drawings and the illustrative embodiments depicted therein, a mirror system 10 is illustrated as including a driver side mirror 12, typically mounted to the driver's door on the exterior of the vehicle, a passenger side mirror 13 mounted to the exterior of the passenger side door, an interior mirror 14 mounted in the interior of the vehicle and a control 16 for providing signals over output lines 18, 20 and 21 in order to control the respective reflectance level of mirrors 12, 13 and 14 (FIGS. 1A-1E). In the illustrated embodiment, mirrors 12, 13 and 14 have reflectance elements with reflectivity levels that are continuously variable over a range of approximately from 6-80%. The reflectivity of mirrors 12, 13 and 14 is established by signals provided on lines 18, 20 and 21, respectively, which may be analog voltage, analog current, pulse width modulated digital signals or the like. In one preferred embodiment, mirrors 12, 13 and 14 are solid-state electrochromic elements such as disclosed in U.S. Pat. No. 4,712,879, issued to Niall Lynam for a ELECTROCHROMIC MIRROR the disclosure of which is hereby incorporated by reference herein. This technology is more readily adaptable to large area mirrors, particularly large mirrors of the type used on large trucks, and is very suitable for use as curved mirrors because it requires only a single sheet of glass to bend and it is capable of operation at low reflectivity values for extended periods of time without a segregation of coloration, as occurs with other types of electrochromic elements. Furthermore, such solid state electrochromic element is capable of substantially bleaching from a low reflectance colored state to a high reflectance state in a matter of a few seconds, and typically one to three seconds. This allows such an element to rapidly respond to a driver's need for good visibility in the mirrors Mirror system 10 additionally includes a first selection means 22, which is provided for the purpose of selecting a comfortable reflectivity level based upon particular driving conditions and the desires of the driver. As previously mentioned, the professional driver utilizes mirrors as a primary driving aid and will typically select a reflectance level that provides exceptionally good visibility from the mirrors, even if occasional glare levels become somewhat uncomfortable. Mirror system 10 additionally includes a second input device 24 that, when actuated, abruptly decreases the reflectivity of the mirrors. The second input device provides an override mode, or "panic button," for quickly responding to excessive glare conditions. When input device 24 is actuated, mirrors 12, 13 and 14 are rapidly colored to their minimum reflectivity level. When the glare condition ceases, a second actuation of input device 24 restores control over the reflectivity level of mirrors 12, 13 and 14 to the first input device 22. If the driver does not return the mirrors to their higher reflectivity level after a predetermined period of time, control 16 will automatically do so.

Mirror system 10 additionally includes a third input device 25 that, when actuated, rapidly increases the reflectivity of the mirrors to a high reflectance level. The third input device provides an override mode for rapidly providing high visibility in the mirrors when required by the driver. For example, when it is necessary to make lane-change, the driver may actuate input device 25 in order to obtain the optimum image possible in the mirrors 12 and 13. When input device 25 is deactuated, the reflectivity level of the mirrors is returned to that which existed prior to actuation of the input device 25. If the user had previously actuated the second input device 24 in order to respond to a glare condition to lower the reflectivity of the mirrors and immediately actuated input device 25, in order to obtain high reflectivity to make a critical driving decision, the reflectivity level of the mirrors will return to the anti-glare low reflectivity level invoked by the actuation of the second input device 24. Under other circumstances, the reflectance level will return to the comfort level established by the first selection means 22 upon deactuation of the third input device 25. Although input device 25 may be a user actuatable device, it may additionally be made responsive to the condition of the vehicle. For example, input device 25 may be responsive to the vehicle being in the reverse-gear to provide a high reflectivity of the mirrors when the driver is backing the vehicle to a loading dock.

First user input device 22 is illustrated as a variable potentiometer 26 that allows the user to select from a continuum of reflectivity levels based upon the position of wiper 28. While it may be desirable to allow the driver to select any reflectivity level within the physical capability of mirrors 12, 13 and 14, in a preferred embodiment, variable potentiometer 26 is capable of adjusting the reflectivity of mirrors 12, 13 and 14 in a range of approximately 20-80%. It has been discovered that, below approximately 30%, truck drivers are sometimes unable to clearly discern the shapes of objects viewed in the mirror. For car drivers, it may be desirable to extend the reflectivity comfort range down to approximately 20%. Accordingly, it is deemed desirable to limit the driver's choice of a comfort reflectivity setting to a level that maintains good rearward visibility and that provides moderate glare protection. When extreme glaring conditions are experienced, the override mode through input device 24 allows the driver to temporarily relinquish some rear visibility in return for added glare protection.

Figure 4:
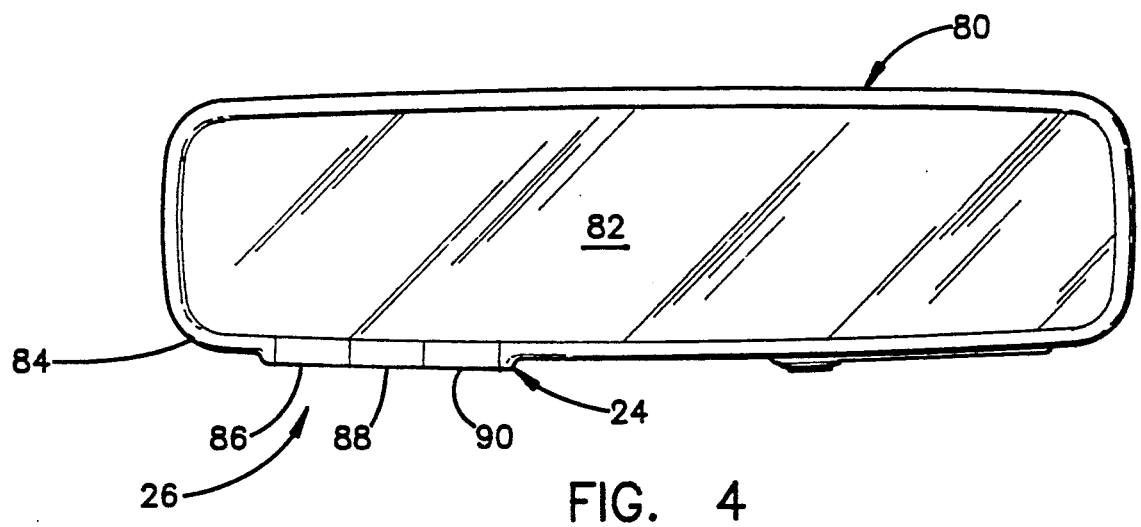
FIG. 4 illustrates the invention applied to an interior mirror.

In an embodiment illustrated in FIG. 4, an interior mirror 80 includes a variable reflective element 82 mounted within a housing 84. In this embodiment, first input device 22 is illustrated in the form of a slew-control having momentary switches 86 and 88 which, when activated, cause the reflectance level of the mirror to slew upwardly or downwardly. Second, input device 24 is illustrated in the form of a single momentary switch 90. Switches 86, 88 and 90 could be mechanical, membrane or capacitive and are typically manually activated. This embodiment of the invention is convenient as an "option" because the entire mirror system, including controls, is packaged in one unit.

Figure 5:
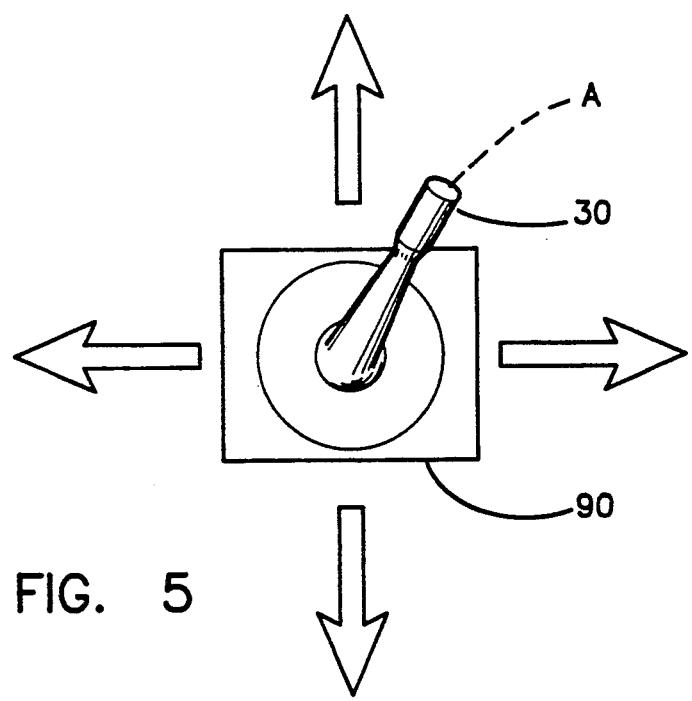
FIG. 5 illustrates a remote mirror position control device incorporating the invention.

In the embodiment illustrated in FIG. 5, push button switch 30 is integrated with a "joystick" 90 used to adjust the position of the exterior mirrors 12, 14. In such embodiment, switch 30 could be actuated by pressing axially on the joystick as shown at A. While first input device 22 is illustrated as a continuously variable potentiometer, it may alternatively be a discrete step switch that selects between a finite number of discrete reflectance levels for the mirror or as a slew-control as illustrated in FIG. 4. Input devices 22, 24 and 25 could be manually activated, voice activated, touch activated, infrared remotely activated, or activated by a similar device.

In the embodiment illustrated in FIG. 1A, the comfort reflectivity level of mirrors 12, 13 and 14 is jointly established by first input device 22. Upon the experiencing of a glare condition, mirrors 12, 13 and 14 are also simultaneously colored to a minimum reflectance level by the actuation of a single user input device 24. An alternative embodiment, illustrated in FIG. IB, includes separate comfort reflectance level controls 22A, 22B and 22C for establishing separate comfort levels for mirrors 12, 13 and 14, respectively. This accommodates the frequent difference in the light environment at different locations on the vehicle as well as the difference in the extent to which the different mirrors are relied upon. In the FIG. 1B embodiment, however, a single override input device 24 causes mirrors 12, 13 and 14 to simultaneously color to a low reflectivity state. In another alternative embodiment, illustrated in FIG. 1C, a single input device 22 establishes the comfort reflectance level of mirrors 12, 13 and 14 while separate override devices 24A, 24B and 24C are provided to individually color mirrors 12 and 14, respectively, to low reflectivity states. Other combinations would also be apparent to those skilled in the art.

Figure 1D:
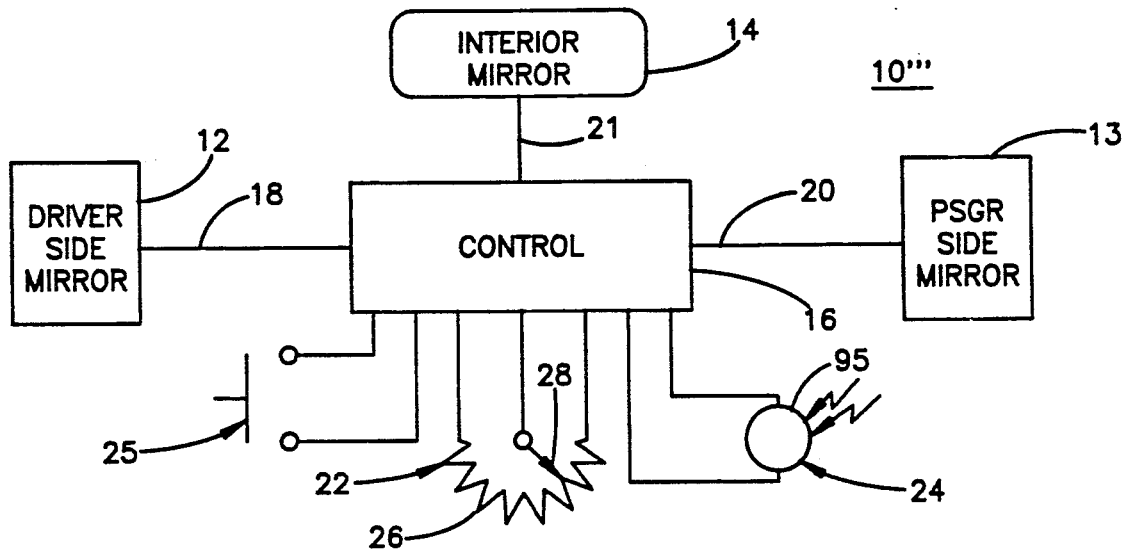

In the embodiment illustrated in FIG. 1D, second input device 24 is provided as a photosensor 95 that is configured in a manner to sense glare-producing light, i.e., that which is incident the mirror. This may be obtained by orienting photosensor 95 to face rearwardly of the vehicle. Control 16 responds to photosensor 95 in a manner that the comfort level established by input 22 will be overridden to the lower reflectivity level when the glare producing light sensed by sensor 95 is above a predetermined level. In this embodiment, the comfort level of reflectivity of the mirrors is manually established by the user, is selectively overridden by the detection of a glare condition and resumes the comfort level when the glare condition is no longer present.

Figure 1E:
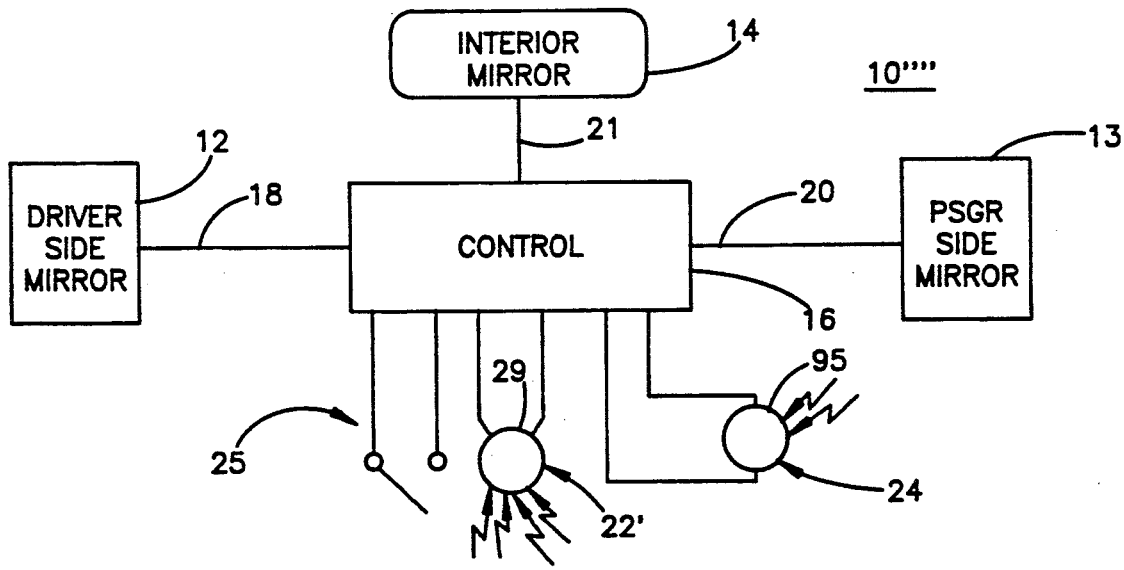

In the embodiment illustrated in FIG. 1E, the comfort level of the mirror system is established by first input device 22' which is a photosensor 29 that is configured to respond to the ambient light condition This is achieved by orienting sensor 29 to respond other than to light directed incident the mirror surface and by providing a long time constant in the portion of control 16 that responds to the sensor 29. In terms of placement of the ambient sensor, it is preferred to place it in a location where the sensor is protected both from dirt and dust, and from head lamp glare, street lights, etc., that, otherwise, could create a false signal. The ambient light level in the interior cabin of the vehicle is an indication of the outside ambient level. Thus it is preferred to locate the ambient sensor within the interior cabin of the vehicle where it is protected from dirt, etc., and preferably facing away from glare sources such as approaching vehicles, street lights and the car interior lighting. The ambient photosensor can be located close to the mirror positioning/variable reflectance element manual circuitry controls, or can be separate. The sensor can be appropriately shielded so that its field of view avoids glare sources while it is measuring ambient light levels The ambient sensor can distinguish between high (day), medium (dusk/city driving), and low (dark country roads/highways) ambient levels and select any one of several comfort levels dependent on the level of ambient sensed. In terms of light intensity, a high ambient would be a light intensity in excess of 130 lux, or thereabouts. A medium ambient would be a light intensity in the region of 130 to 20 lux, or thereabouts. A low ambient would be a light intensity below about 20 lux. When used in a window system, as in the broader aspects of this invention, the ambient sensor is not directly facing the sun so as to be effected by solar glare. By so shielding from solar glare, and by providing a long time constant in the portion of the control circuit that responds to the ambient sensor, the variable transmission element (an electrochromic sunroof, for example) so controlled responds only to lasting and sustained changes in the ambient light level and does not exhibit rapid, and possibly objectionable, fluctuations in light transmittance due to changes in solar glare such as would occur when the sun passes between or through clouds on a sunny day.

The use of an ambient sensor as the first input device has the advantage of the mirrors dimming to a particular comfort level when ambient lighting is low and returning to high reflectance when ambient is high. This is useful at dusk/dawn when the driver would like mirrors to dim, or dimmed mirrors to clear, without his/her personal intervention. In this embodiment, the comfort level of mirror system 10'''' is greatest during high ambient conditions such as during daylight conditions and is lowered in response to lower ambient conditions. The comfort level may be either continuously varied as a direct proportion to the ambient light level or may be changed in a step-wise fashion. A user-operated sensitivity control can be provided to determine sensitivity of switching between the various comfort levels. Therefore, as the ambient condition decreases, for example as the driver begins to experience dusk, the reflectivity level of the mirror is decreased. This is important in a remotely actuated mirror system because the driver's eyes will become more sensitized to the low ambient condition and hence to any glare-producing light. When it is desired to have a high reflectivity state during such low-ambient condition, the user merely actuates input device 25 to cause the mirror system to rapidly assume a high reflectivity state. Of course, second input device 24 provides an override for high-glare conditions. However, the driver will typically desire the mirror to normally be at the comfort level established by input 22'. Therefore, this embodiment of the invention incorporates use of an ambient sensor to determine the comfort level while retaining user selectable control over the return to high reflectance, and optionally retaining a manually selected or photoelectrically triggered second override to temporarily access the fullest dimmed state during periods of intense glare.

Thus, the first manual input means of the circuitry of this invention could be optionally replaced with an ambient detector such as a phototransistor whose suitably amplified and configured voltage output could serve as the voltage source to power the variable reflectance mirror to, at least, a comfort level from which further override means are optionally provided to achieve even greater glare protection; all the time, retaining manually (or reverse gear) selectable means to return to the high reflectance state. Alternatively, the ambient sensing means could control the mirror such that, by day, it is at full reflectance; at dawn/dusk and during city/highway driving, the mirror reflectivity is set to at least a lower comfort level; and at night during extremely low ambient such as is experienced in country road/highway driving, the variable reflectance element is controlled to color to its fullest dimmed state.

It should be emphasized that control of the mirror reflectance based on ambient sensing is distinct from control due to glare sensing. Thus, as shown in FIG. 1E, one embodiment of this invention uses two photosensors, the first being an ambient light sensor and the second being a glare intensity detector. Photosensor 22' is an ambient sensing means that, dependent upon the intensity of ambient light detected, dims the mirror system within a reflectance range between the highest reflectance level (around 80%R for example) down to some comfort level (30%R for example). No matter how low the ambient, the control circuitry will not apply a voltage greater than that required to dim the mirror system to the desired comfort level. Photosensor 22' is shielded from headlamp and direct sunlight glare and could be facing forward of the vehicle, or could be facing into the interior cabin (recall the interior cabin ambient is related to the exterior ambient) but not facing directly rearward or sidewards where it could be subject to headlamp glare, nor should it be subject to glare from interior lighting in the vehicle. Photosensor 95 is a rearward facing glare detector. Its circuitry can be such that it is activated only when the ambient sensor has established a comfort level close to 30%R or thereabouts. Upon detection of excessive glare, photodetector 95 selectively overrides the comfort level set by photosensor 22' and dims the mirror to lower reflectance levels. For any ambient level detected by 22' and for any excessive glare detected by 95, the bleached state is solely accessed through manual operation of bleach control 25.

Figure 2:
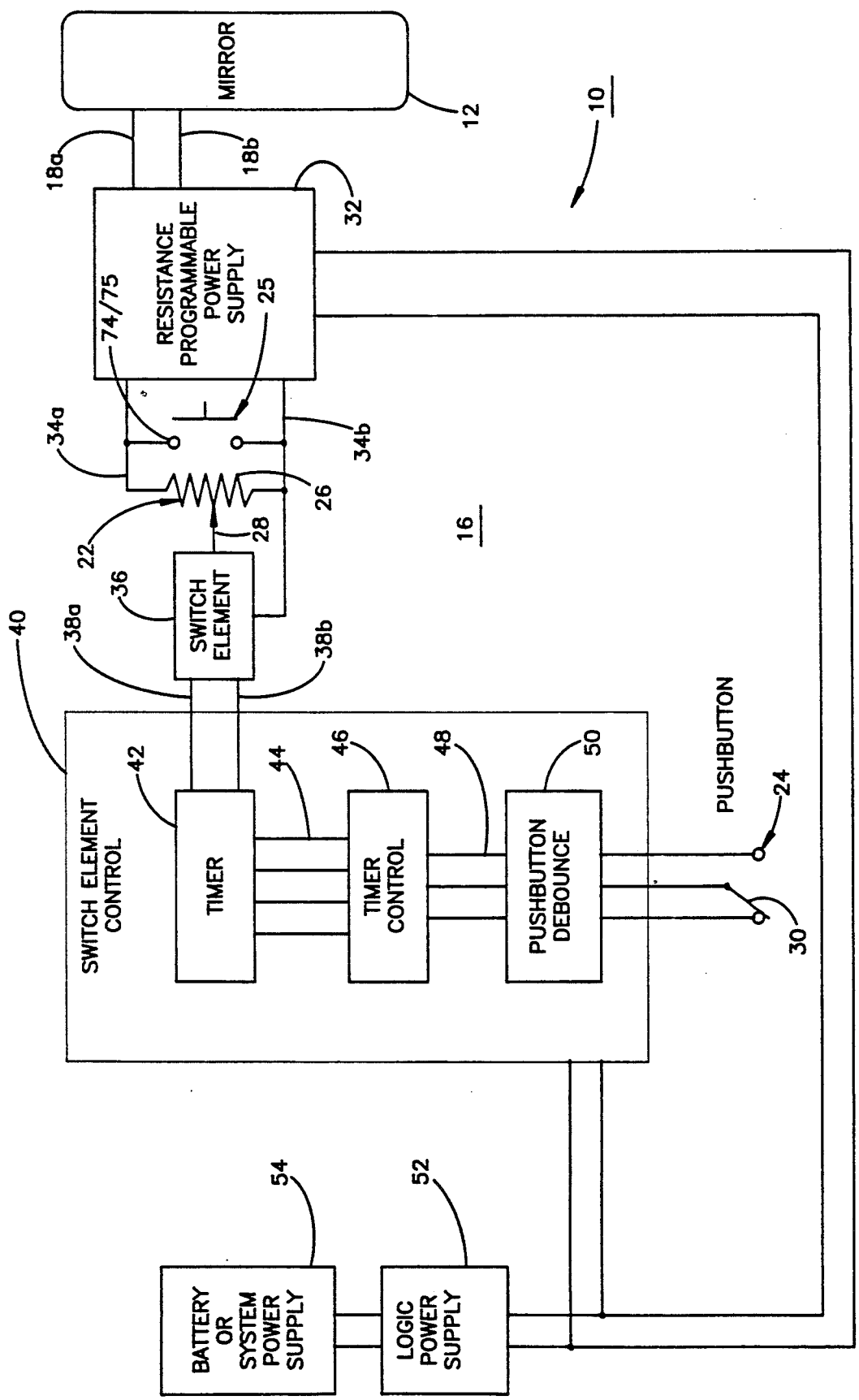
FIG. 2 is a more detailed block diagram of a single-mirror control according to the invention.

In an embodiment of mirror system 10 illustrated in FIG. 2, in which only one mirror (12) is illustrated for clarity, a resistance-programmable power supply 32 establishes a variable analog voltage on its output lines 18A, 18B extending to mirror 12. The value of the analog voltage on lines 18A, 18B is established by the resistance value across lines 34A and 34B that are input lines to power supply 32. The resistance between lines 34A and 34B is established by the position of wiper 28 along potentiometer 26 if a switch element 36 is closed, i.e., electrically interconnecting, or shorting, wiper 28 with line 34B. If switch element 36 is open, then the resistance of the main winding of potentiometer 26 establishes the resistance between lines 34A and 34B irrespective of the position of wiper 28.

The open/closed state of switch element 36 is established by output lines 38A, 38B extending from a switch element control 40. Switch element control 40 includes a timer circuit 42 which produces output on lines 38A, 38B and receives inputs on lines 44 extending from a timer control circuit 46. Timer control circuit 46 receives its input on lines 48 from a push button debounce circuit 50 which, in turn, is connected with single pole momentary double-throw switch 30. Switch element control 40 and resistance-programmable power supply 32 receive regulated DC supply voltage from a power supply 52 that is powered from the vehicle's battery system 54.

Under normal driving conditions, timer 42 produces signals on lines 38A, 38B causing switch element 36 to be closed. This allows the user to select the reflectivity level of mirror 12 by adjusting the position of wiper 28 of potentiometer 26. The variable resistance provided by movement of wiper 28 is translated by power supply 32 into a variable analog signal on lines 18A, 18B. When the driver experiences a glare condition that the driver desires to be compensated for, the driver actuates push button 30. Upon actuation of push button 30, timer 42 changes the state of the signal on lines 38A, 38B which causes switch element 36 to open. This causes the resistance across lines 38A, 38B to be at a maximum value established by the resistance of the main winding of potentiometer 26, which corresponds to a maximum analog output on lines 18A, 18B. This colors mirror 12 to a minimum reflectivity level at a rapid rate. If push button 30 is again actuated while timer 42 is timing, timer control 46 will respond by resetting timer 42. This will cause the output of timer 42 on lines 38A, 38B to again close switch element 36 to return control of the reflectance level of mirror 12 to wiper 28 of potentiometer 26. If timer 42 times out without push button 30 being pressed, it resets and produces outputs on lines 38A, 38B which closes switch element 36 and returns control to wiper 28. Therefore, after wiper 28 is overridden by the actuation of push button 30, control is returned to wiper 28 upon the first occurrence of the driver reactuating push button 30 or timer 42 timing out. In the illustrative embodiment, timer 42 is set for 130 seconds but a shorter or longer period may be used.

Input device 25, which includes a switch 74/75 connected across lines 34A, 34B and in parallel with potentiometer 26, will abruptly lower the resistance across lines 34A, 34B which will, in turn, cause a bleach voltage to be applied across lines 18A, 18B. This will abruptly increase the reflectance level of mirror 12. When input device 25 is deactuated, the output from programmable power supply 32 to mirror 12 will resume the value that it had prior to actuation of input device 25.

Figure 3:
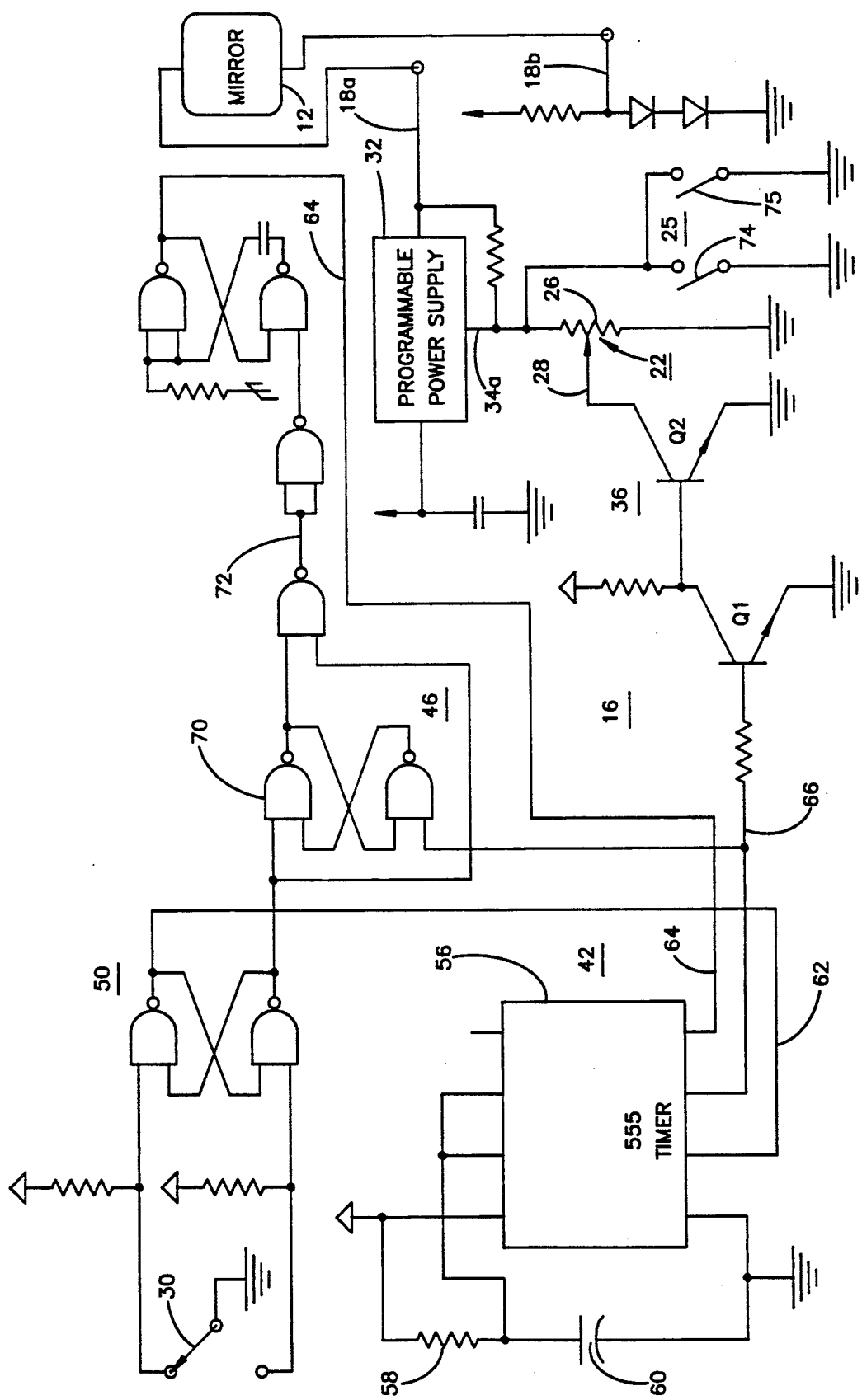
FIG. 3 is a schematic diagram of a control circuit of an embodiment of the invention.

A detailed embodiment of control 16 is illustrated in FIG. 3, in which a conventional timer circuit 56, whose time duration is established by a resistor 58 and capacitor 60, is set by the actuation of its set line 62 and reset by actuation of its reset line 64. When set, timer circuit 56 produces an output on line 66 that turns a transistor Q1 on which turns off, or opens, a transistor Q2. Transistors Q1 and Q2 define switch element 36. Resistance-programmable power supply 32 produces an output on line 18A that is proportional to the resistance on its input line 34A, which is established by the resistance of potentiometer 26, irrespective of the position of wiper 28, when transistor Q2 is turned off. Transistor Q2 is turned on when timer circuit 56 is reset with its output on line 66 at a low level, which causes transistor Q1 to be open and Q2 to be conducting. Timer control circuit 46 includes a latch-circuit 70 which produces an output on line 72 when switch 30 is actuated with output 66 in a set state. This produces, in turn, a reset pulse on line 64 to reset timer circuit 56 if it is timing. If timer circuit 56 is not timing, the actuation of switch 30 does not produce a reset pulse on line 64.

In the embodiment illustrated in FIG. 3, a switch 74, when closed, shorts potentiometer 26. This causes the output on lines 18A and 18B to go to the minimum analog output voltage which is a maximum reflectivity condition. Thus, switch 74 may serve as a manual override device in order to place the mirror system 10 in a maximum reflectivity state. Another switch 75, which is connected in parallel with switch 74, may be actuated by the reverse-gear of the vehicle in order to place mirror system 10 in a maximum reflectivity state when the vehicle is being backed into a loading dock. When both switches 74 and 75 are then open, the reflectivity of the mirror returns to the comfort level previously set by the driver, or to the low-reflectivity level established by the switch element control.

Because the override input device 24 is intended to rapidly force the associated mirrors 12, 13 and 14 to a minimum reflectivity level, it may be desirable to provide a dynamic circuit between power supply 32 and the mirror to increase the rate of coloration of the mirror. Such rapid-coloration feature as disclosed in commonly-owned co-pending application Ser. No. 07/431,284, filed Nov. 3, 1989, by Thomas D. Gaffney et al., for a DRIVE CIRCUIT FOR AN ELECTROCHROMIC CELL, the disclosure of which is hereby incorporated herein by reference, may be especially useful. The details of such rapid-coloration circuit are disclosed in the Gaffney et al. application and will not be repeated. Suffice to say, that a temporary overshoot is provided in the voltage supplied on lines 18A, 18B in order to rapidly color the mirror. The overshoot is of a short enough duration to not damage the mirror.

Mirrors 12 and 13 are preferably all solid-state electrochromic mirrors of the type disclosed in U.S. Pat. Nos. 4,712,879 issued to Niall R. Lynam et al. and entitled ELECTROCHROMIC MIRROR, the disclosure of which is hereby incorporated herein by reference. Such an all solid-state electrochromic mirror includes a multiple layer stack of inorganic metal oxide thin films including an anodically coloring electrochromic film and a cathodically coloring electrochromic film. The multiple layer stack may additionally include an inorganic metal oxide film that is both ion transporting and electron insulating. Such a device provides exceptional speed of bleaching. It is preferred because it allows rapid increase in the reflectivity of the mirrors when the override input 25 is selected. Typically, such an all-solid state electrochromic mirror is capable of substantially bleaching within one to three seconds. Additionally, reflectivity values of as great as 70–80% may be achieved. This is most desirable in the present application because it allows the professional driver exceptionally high visibility for making lane-change decisions and backing into loading docks and the like.

However, the present invention provides a comfort level that will typically be in the range of 20–60% which is the level preferred by many drivers during periods of moderate glare. When the high reflectivity condition is required, it is rapidly achieved by actuation of the override means 25 to rapidly bleach the all solid-state electrochromic mirror.

Figure 6:
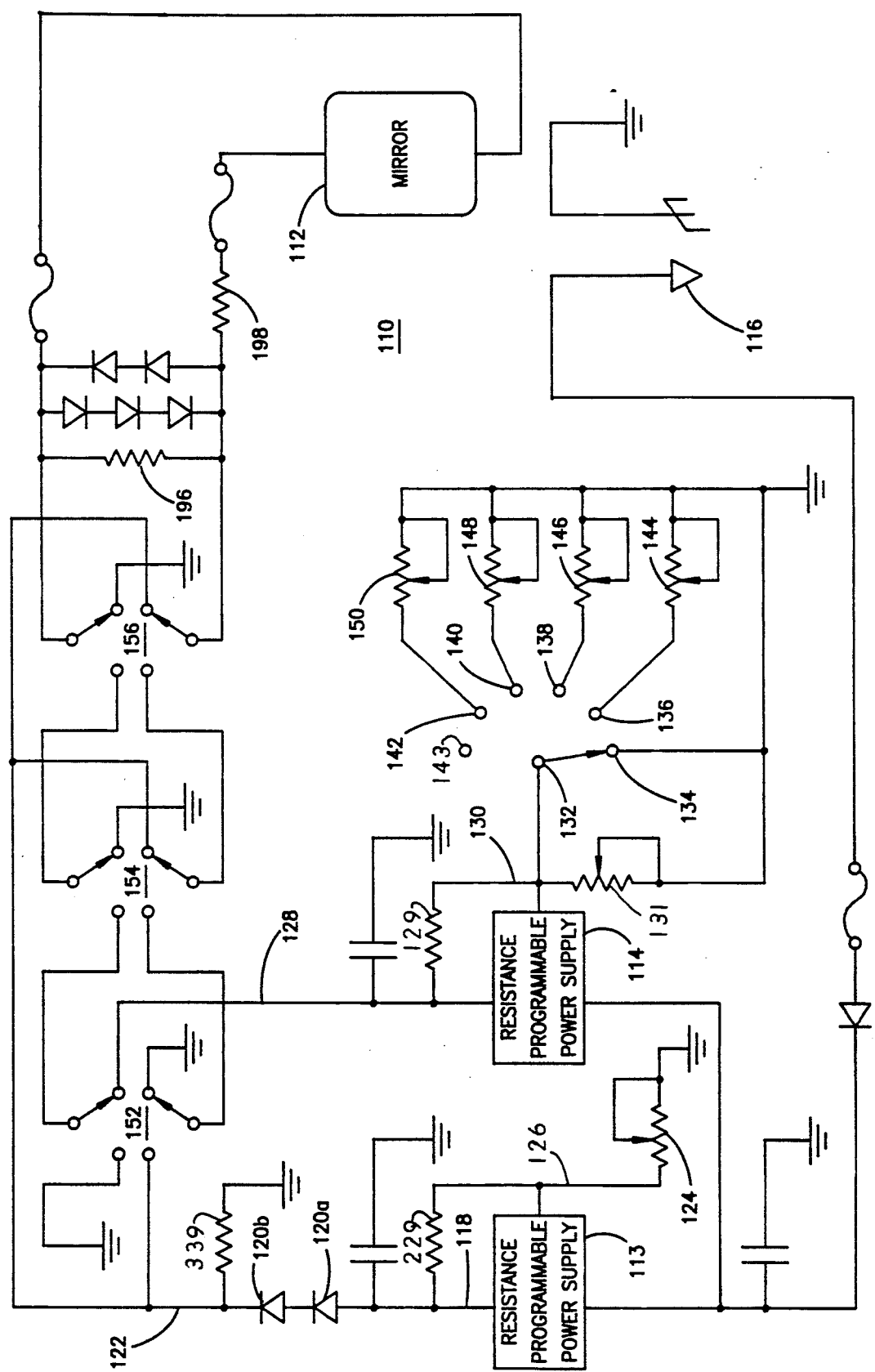
FIG. 6 is a schematic diagram of a control circuit illustrating another embodiment of the invention.

In an embodiment illustrated in FIG. 6, mirror system 110 includes a first resistance programmable power supply 113 and a second resistance programmable power supply 114. Programmable power supply 113, 114 receive a DC voltage from the vehicle's ignition system through terminal 116. The output 118 of power supply 113 is connected through a pair of forwardly poled diodes 120A, 120B through a line 122 which provides a voltage level representative of a high reflectivity condition. The voltage level on line 122 is established by a potentiometer 124 which provides an input to power supply 113 on line 126. Resistance programmable power supply 114 provides an output on a line 128 which is determined by a resistance value established at an input 130 thereof. Input 130 is, in turn, established by a rotary switch 132 which is selectively connected with a ground terminal 134, a terminal 136, 138, 140, 142 or 143. Terminal 136 is connected through a potentiometer 144 to ground. Terminal 138 is connected through a potentiometer 146 to ground. Terminal 140 is connected through a potentiometer 148 to ground, and terminal 142 is connected through potentiometer 150 to ground. Terminal 143 is at open-circuit. Potentiometers 144 through 150 are adjusted in order to provide selectable resistance values on input 130 which correspond to reflectance levels on mirror 112 that are at discrete values such as 10%, 20%, 30% and the like.

Output 122 from power supply 113 and output 128 from power supply 114 are provided to opposite terminals of a double-pole double-throw (DPDT) switch 152. Switch 152 is an override switch that allows the user to selectively apply the voltage on line 122 to the mirror 112 in order to select a high reflectivity state for the mirror. The outputs from switch 152 are, in turn, connected to another DPDT switch 154 which is responsive to the vehicle being placed in a reverse gear, in order to apply the voltage on line 122 across mirror 112. The output from switch 154 is, in turn, connected with a DPDT switch 156, which is interconnected with the vehicle's headlights in a manner that the voltage on line 122 will be connected with mirror 112 when the vehicle's headlights are off in order to place the mirror in a high reflectance state during high ambient conditions, such as during daylight hours. In contrast, the comfort level established by the voltage on line 128 will be applied to mirror 112 through the arrangement of switches 152, 154 and 156 if the headlights are turned on, the vehicle is not in reverse gear and the user has not manually placed the mirror system in a high reflectivity state. Under these conditions, the level of reflectivity of mirror 112 is established by the manual setting of switch 132.

In the event that power to the circuit is lost while the mirror is in a dimmed state, resistor 196 serves as a low resistance path to drain whatever charge is stored in the variable reflective element so that it rapidly rises in reflectivity to its highest reflectance level. For electrochromic mirrors powered by applied DC potentials in the 0.5V to 2V range, resistor 196 is typically 43 ohms in resistance, or thereabouts, and is rated at 1 watt. Resistor 196 thus serves as a fail-to-day means should power be lost. Alternatively, a relay contact could be held open when the circuit is powered but which, if power is lost, closes so as to short the electrodes on mirror 112 and thereby rapidly bleach it to its highest reflectance level Resistor 198 is a low resistance (1 ohm or thereabouts) resistor placed in series with the variable reflectance mirror 112. Resistor 198 is a current limiting resistor intended to limit the initial large current transient typical upon first coloration or bleach of electrochromic devices. Use of resistor 198 has the beneficial effect of avoiding a large current surge through the circuitry and into mirror 112 whenever the mirror is colored from the bleached state down to a dimmed reflectance level, and of assisting uniformity of coloration and bleaching across large-area devices Electrochromic devices, upon first application of voltage, typically color fastest and deepest in the perimetal regions closest to the busbars Coloration in the central region lags that of the perimetal regions so that coloration is observed, and is most noticeable if rapid, as an iris-type wave from the perimetal regions to the center. Conversely, bleaching is fastest in the perimetal regions and is somewhat slower in the central region so that bleaching is observed, and is most noticeable if rapid, as an inverse iris-type wave from the perimetal regions into the central region. By limiting the initial coloration and initial bleach current, and thereby limiting the applied potential, resistor 198 slows both coloration and bleaching such that the iris effects described above are averaged over a longer time duration and thus are less noticeable to the viewer. Use of resistor 198 in the circuitry of FIG. 6 is particularly appropriate when driving large area, all solid-state electrochromic devices (such as 16"×6" truck mirrors) of the type disclosed in U.S. Pat. No. 4,712,879. The bleach speed of all-solid state electrochromic devices is sufficiently fast that use of a 1 ohm, or thereabouts, resistor in series therewith beneficially slows the very rapid bleach speed (and thereby facilitating use of less conductive and more economic transparent conducting layers in the device design) but wit the bleach speed still remaining close to the rapid bleach response desired for manually operated devices As a specific example of the combination of the specialized circuitry of FIG. 6 with an electrochromic mirror element, the resistance programmable power supplies 113, 114 were type T LM317T variable voltage regulators. With resistor 129 being 240 ohms and potentiometer 131 set for 109 ohms, potentiometers 144, 146, 148 and 150 were set to resistances of 17 ohms, 49 ohms, 103 ohms and 212 ohms respectively, causing output 128 of resistance programmable power supply 114 to be approximately 1.25 volts, 1.3 volts, 1.4 volts, 1.5 volts, 1.6 volts and 1.8 volts for terminal positions 134, 136, 138, 140, 142 and 143, respectively, of rotary switch 132. With mirror element 112 being an all solid-state electrochromic mirror designed to achieve a minimum reflectance close to 10% at 1.8 volts applied, and of the type disclosed in U.S. Pat. No. 4,712,879 issued to Niall R. Lynam et al., the various discrete voltages above on line 128 would correspond to mirror reflectances of approximately 44%, 40%, 30%, 20%, 12% and 10%, respectively. Also, with resistor 229 being 240 ohms and potentiometer 124 set to 200 ohms and resistor 339 being 43 ohms, the output 122 of resistance programmable power supply 113 is set to provide $-0.8V$ as a voltage level representative of the high reflectivity condition of the all solid-state electrochromic mirror. When forward biased, silicon diodes 120a, 120b each individually reduce the voltage output on line 118 by approximately 0.7V.

While the invention has been described with reference to its advantages when used by professional drivers and with large vehicles such as large trucks, its advantages are not limited in this manner and it may be useful in other applications. The invention comprehends the inclusion of memory means within control 16 such that the comfort setting of the mirror system for various drivers may be stored and called up when that driver is operating the vehicle. Other locations for the input devices will suggest themselves. For example, the input devices could be conveniently positioned on or adjacent to the steering wheel or the steering column.

The present invention is not only functional and capable of providing optimum individual control to the driver, but it is also natural in its use. Accordingly, its incorporation with other control devices, such as mirror-positioning devices that are already familiar to the driver, tends to cause the features of the invention to become second-nature to the driver with minimum or no instructions. This is especially important when the invention is applied to rental cars or in other applications where driver familiarity with the vehicle cannot be taken for granted. Also, the natural feel to the control will enhance the instinctive reactions of the driver and serve as an extension of the driver's control over the vehicle.

Changes and modifications in the specifically described embodiments can be carried out without departing from the principles of the invention which are intended to be limited only by the scope of the appended claims, as interpreted according to the principles of patent law including the Doctrine of Equivalents.

The embodiments of the invention in which an exclusive property or privilege is claimed are defined as follows:

1. A rearview mirror system for a vehicle comprising:
   a reflective element having a controllable variable reflectivity;
   a control that is adapted to establishing the level of reflectivity of said reflective element;
   a first input device for said control that is adapted to causing said control to establish a first level of reflectivity of said reflective element at a comfort level that is a function of ambient light levels, said level of reflectivity being selected from a continuously variable first range of reflectivity values,
   a user operable second input device for said control that is selectively actuatable by a user in order to cause said control to establish a second level of reflectivity of said reflective element that is greater than said first level, wherein actuation of said second input device selectively overrides said first input device when actuated; and
   wherein said control returns the level of reflectivity of said reflective element to the level of reflectivity established by said first input device upon deactuation of said second input device.

2. The rearview mirror system in claim 1 wherein said second level is at least 60l% reflectance.

3. The rearview mirror system in claim 1 wherein said controllable variable reflectivity of said reflective element is variable over a given range of reflectivity values and wherein said first level of reflectivity is within another range of reflectivity values that is within and narrower than said given range of reflectivity values.

4. The rearview mirror system in claim 1 wherein said first input device is user manipulable for manually establishing a desired comfort level of reflectivity.

5. The rearview mirror system in claim 1 wherein said second input device is user manipulable in order to selectively establish said second reflectance level.

6. The rearview mirror system in claim 1 wherein said second input device is actuated in response to the vehicle being placed in reverse gear.

7. The rearview mirror system in claim 1 wherein said reflective element changes reflectivity from said first to said second levels at a faster rate than from said second to said first levels.

8. The rearview mirror system ion claim 1 including means for causing said reflectance element to achieve a maximum reflectivity value when electrical power to said system is interrupted.

9. The rearview mirror system in claim 1 wherein said control includes memory means for storing at least one value of said first level of reflectivity, whereby values of said first level of reflection can be stored and can be retrieved for multiple vehicle drivers or upon power being removed and restored to said rearview mirror system.

10. The rearview mirror system in claim 1 including another reflective device having a controllable variable reflectivity and wherein said control is adapted to controlling the reflectivity of both of said reflective devices.

11. The rearview mirror system in claim 10 wherein said first input device is adapted to causing said control to establish said first level of reflectivity for both of said reflective devices.

12. The rearview mirror system in claim 1 wherein said vehicle includes headlights and switch means for selectively actuating said headlights, and further wherein said first input device is actuated in response to said switch means actuating said headlights.

13. The rearview mirror system in claim 12 wherein said second input device is actuated in response to the vehicle being placed in reverse gear irrespective of whether said switch means is actuating said headlights.

14. The rearview mirror system in claim 1 wherein said first input device is an ambient light sensor.

15. The rearview mirror system in claim 14 wherein said reflective element is an exterior mirror and further wherein said ambient light sensor is positioned in an interior portion of said vehicle.

16. The rearview mirror system in claim 14 wherein said control lowers said first level of reflectivity in response to lower level of ambient light sensed by said ambient light sensor.

17. The rearview mirror system in claim 1 wherein said reflective element comprises an all solid-state electrochromic mirror.

18. The rearview mirror system in claim 17 wherein said mirror includes a multiple-layer stack of inorganic metal oxide thin film layers.

19. The rearview mirror system in claim 18 wherein said multiple-layer stack includes an anodically coloring electrochromic film and a cathodically coloring electrochromic film.

20. The rearview mirror system in claim 18 wherein said multiple-layer stack includes an ion transporting and electron insulating inorganic metal oxide film 21. A rearview mirror system for a vehicle comprising:
   a reflective element having a controllable variable reflectivity;
   a control that is adapted to establishing the level of reflectivity of said reflective element;

a first input device for said control that is adapted to causing said control to establish a first level of reflectivity of said reflective element;

a second input device for said control that is selectively actuatable in order to cause said control to establish a second level of reflectivity of said reflective element that is greater than said first level, wherein actuation of said second input device selectively overrides said first input device when actuated;

wherein said control returns the level of reflectivity of said reflective element to said first level upon deactuation of said second input device; and current limiting means for controlling the rate of change of reflectance of said reflective element.

22. The rearview mirror system in claim 21 wherein said current limiting means includes a resistor in series with said reflective element 23. The rearview mirror system in claim 21 including means for causing the reflective element to achieve a maximum reflectivity value when electrical power to said system is interrupted.

24. The rearview mirror system for a vehicle comprising:
   a reflective element having a controllable variable reflectivity;
   a control that is adapted to establishing the level of reflectivity of said reflective element;
   a first input device for said control that is adapted to causing said control to establish a first level of reflectivity of said reflective element;
   a second input device for said control that is selectively actuatable in order to cause said control to establish a second level of reflectivity of said reflective element that is less than said first level, wherein actuation of said second user input device selectively overrides said first user input device when actuated;
   a third input device for said control that is selectively actuatable in order to cause said control to establish a third level of reflectivity of said reflective element that is greater than said first level, wherein actuation of said third input device selectively overrides said first and second input devices when actuated; and
   wherein said control returns the level of reflectivity of said reflective element upon deactuation of said third input device to the one of said first and second levels that existed upon actuation of said third input device.

25. The rearview mirror system in claim 24 wherein said reflective element has a range of reflectivity values and wherein said first input device is adapted to causing said control to establish said first level from a range of reflectivity values that is more narrow than said range of reflectivity of said reflective element.

26. The rearview mirror system in claim 24 wherein said third level is at least 60% reflectance.

27. The rearview mirror system in claim 24 wherein said first input device is user manipulable for manually establishing a desired comfort level of reflectivity.

28. The rearview mirror system in claim 24 including another reflective device having a controllable variable reflectivity and wherein said control is adapted to controlling the reflectivity of both of said reflective devices.

29. The rearview mirror system in claim 24 wherein said second input device is user manipulable in order to selectively establish said second level of reflectivity.

30. The rearview mirror system in claim 24 wherein said second input device is a photosensor that is responsive to glare-producing light exceeding a predetermined level.

31. The rearview mirror system in claim 24 wherein said third input device is actuated in response to the vehicle being placed in reverse gear.

32. The rearview mirror system in claim 24 wherein said reflective element changes reflectivity from one of said first and second levels to said third level at a faster rate than from said third level to one of said first and second levels.

33. The rearview mirror system in claim 24 wherein said control includes memory means for storing at least one value of said first level of reflectivity, whereby values of said first level of reflection can be stored and retrieved for multiple vehicle drivers or can be retrieved upon power being removed and restored to said rearview mirror system.

34. The rearview mirror system in claim 24 further including current limiting means for controlling the rate of change of reflectivity of said reflective element.

35. The rearview mirror system in claim 34 wherein said current limiting means is a resistor in series with said reflective element.

36. The rearview mirror system in claim 24 further including resume means for causing said second input device to cease being actuated.

37. The rearview mirror system in claim 36 wherein said resume means includes timer means for causing said second input device to cease being actuated a predetermined time duration after being actuated.

38. The rearview mirror system in claim 37 wherein said resume means further includes user override means that is user actuatable for causing said second input device to cease being actuated during said predetermined time duration.

39. The rearview mirror system in claim 24 wherein said first input device is an ambient light sensor.

40. The rearview mirror system in claim 39 wherein said control lowers said first level of reflectivity in response to lower level of ambient light sensed by said ambient light sensor.

41. The rearview mirror system in claim 39 wherein said reflective element is in an exterior mirror and further wherein said ambient light sensor is located within an interior portion of said vehicle.

42. The rearview mirror system in claim 41 wherein said ambient light sensor is used exclusively in said system.

43. The rearview mirror system in claim 41 wherein said ambient light sensor is used concurrently with one of an automatic mirror control and a twilight sentinel.

44. A rearview mirror system for a vehicle comprising:
   a reflective element having a controllable variable reflectivity;
   a control that is adapted to establishing the level of reflectivity of said reflective element;
   a first input device for said control that is adapted to causing said control to establish a first level of reflectivity of said reflective element from a continuously variable first range of reflectivity values;
   a user-actuatable second input device for said control that is selectively actuatable by a user in order to cause said control to establish a second level of reflectivity of said reflective element that is greater than said first level, wherein actuation of said second input device selectively overrides said first input device when actuated; and wherein said reflective element changes reflectivity from said first to said second levels at a faster rate than from said second to said first levels in order to provide a rapid bleach to a high reflective state.

45. The rearview mirror system in claim 44 including means for causing the reflective element to achieve a maximum reflectivity value when electrical power to said system is interrupted.

46. The rearview mirror system in claim 44 further including current limiting means for controlling the rate of change of reflectivity of said reflective element.

47. The rearview mirror system in claim 46 wherein said current limiting means is a resistor in series with said reflective element.

48. The rearview mirror system in claim 44 wherein said reflective element comprises an all solid-state electrochromic mirror.

49. The rearview mirror system in claim 48 wherein said mirror includes a multiple-layer stack of inorganic metal oxide thin film layers.

50. The rearview mirror system in claim 49 wherein said multiple-layer stack includes an anodically coloring electrochromic film and a cathodically coloring electrochromic film.

51. The rearview mirror system in claim 49 wherein said multiple-layer stack includes an ion transporting and electron insulating inorganic metal oxide film.

52. A rearview mirror system for a vehicle comprising:
- a reflective element having a controllable variable reflectivity;
- a control that is adapted to establishing the level of reflectivity of said reflective element;
- a first input device for said control that is adapted to causing said control to establish a first level of reflectivity of said reflective element;
- a second input device for said control that is selectively actuatable in order to cause said control to establish a second level of reflectivity of said reflective element that is greater than said first level, wherein actuation of said second input device selectively overrides said first input device when actuated; and
- wherein said reflective element changes reflectivity from said first to said second levels at a faster rate than from said second to said first levels, wherein said reflective element has a range of reflectivity values, and wherein said first input device is adapted to causing said control to establish said first level from a second range of reflectivity values that is more narrow than said range of reflectivity of said reflective element.

53. The rearview mirror system in claim 52 wherein said second range of reflectivity values is between 20% and 80%.

54. The rearview mirror system in claim 53 wherein said first input device is an ambient light sensor.

55. The rearview mirror system in claim 54 wherein said control lowers said first level of reflectivity in response to a lower level of ambient light sensed by said ambient light sensor.

56. The rearview mirror system in claim 54 wherein said reflective element is an exterior mirror and further wherein said ambient light sensor is located within an interior portion of said vehicle.

57. The rearview mirror system in claim 56 wherein said ambient light sensor is used exclusively in said system.

58. The rearview mirror system in claim 56 wherein said ambient light sensor is used concurrently with one of an automatic mirror control and a twilight sentinel.

59. A light transmitting window system for a vehicle comprising;
- a light transmitting window having a controllable variable level of light attenuation;
- a control that is adapted to establishing the level of attenuation of said transmitting window;
- a first input device for said control that is adapted to causing said control to establish a first level of attenuation of said transmitting window from a continuously variable range of attenuation values;
- a user operable second input device for said control that is selectively actuatable by a user in order to cause said control to establish a second level of attenuation of said transmitting window that has a predetermined relationship to said first level, wherein actuation of said second input device selectively overrides said first input device when actuated; and
- wherein said control returns the level of attenuation of said transmitting window to said first level upon deactuation of said second input device.

60. The system in claim 59 wherein said light transmitting element is a window.

61. The light transmitting system in claim 59 wherein said control includes memory means for storing at least one value of said first level of attenuation, whereby said value of said first level of attenuation can be retrieved upon power being removed from and restored to said system.

62. The system in claim 59 further including current limiting means controlling the rate of change of level of attenuation of said transmitting element.

63. The system in claim 62 wherein said current limiting means is a resistor in series with said transmitting window.

64. The light transmitting mirror system in claim 59 wherein said transmitting window comprises an all solid-state electrochromic element.

65. The light transmitting system in claim 64 wherein said element includes a multiple-layer stack of inorganic metal oxide thin film layers.

66. The light transmitting system in claim 65 wherein said multiple-layer stack includes an anodically coloring electrochromic film and a cathodically coloring electrochromic film.

67. The light transmitting system in claim 65 wherein said multiple-layer stack includes an ion transporting and electron insulating inorganic metal oxide film.

68. A light transmitting system for a vehicle comprising:
- a light transmitting element having a controllable variable level of light attenuation;
- a control that is adapted to establishing the level of attenuation of said transmitting element;
- a first input device for said control that is adapted to causing said control to establish a first level of attenuation of said transmitting element, wherein said transmitting element has a range of attenuation values and wherein said first input device is adapted to causing said control to establish said first level from a second range of attenuation values that is more narrow than said range of attenuation of said transmitting element;

a second input device for said control that is selectively actuatable in order to cause said control to establish a second level of attenuation of said transmitting element that has a predetermined relationship to said first level, wherein actuation of said second input device selectively overrides said first input device when actuated;

and wherein said control returns the level of attenuation of said transmitting element to said first level upon deactuation of said second input device.

69. The light transmitting system in claim 68 wherein said first input device is an ambient light sensor.

70. The light transmitting system in claim 68 wherein said control includes memory means for storing at least one value of said first level of attenuation, whereby said value of said first level of alleviation can be retrieved upon power being removed from and restored to said system.

71. The system in claim 68 wherein said light transmitting element is a rearview mirror.

72. The system in claim 71 wherein said first input device is an ambient light sensor and wherein said control establishes a level of attenuation of said transmitting element that decreases for increasing levels of ambient light.

73. The system in claim 72 wherein said ambient light sensor is located at an interior portion of said vehicle.

74. The system in claim 73 wherein said rearview mirror is located at an exterior portion of said vehicle.

75. A light transmitting system for a vehicle comprising:

a light transmitting window having a controllable variable level of light attenuation;

a control that is adapted to establishing the level of attenuation of said transmitting window;

a first input device for said control that is adapted to causing said control to establish a first level of attenuation of said transmitting window, said first input device being an ambient light sensor and wherein said control establishes a level of attenuation of said transmitting window that increases for increasing levels of ambient light;

a second input device for said control that is selectively actuatable in order to cause said control to establish a second level of attenuation of said transmitting window that has a predetermined relationship to said first level, wherein actuation of said second input device selectively overrides said first input device when actuated; and wherein said control returns the level of attenuation of said transmitting window to said first level upon deactuation of said second input device.

76. The system in claim 75 wherein said ambient light sensor is located at an interior portion of said vehicle.

77. A light transmitting system for a vehicle comprising:

a light transmitting element having a controllable level of light attenuation that is variable over a given range of values;

a control that is adapted to establishing the level of attenuation of said transmitting element;

a user operable first input device for said control that is manually manipulable for causing said control to establish a first level of attenuation of said transmitting element from a continuously variable range of attenuation values within and narrower than said given range of values;

a user operable second input device for said control that is selectively actuatable by a user in order to cause said control to establish a second level of attenuation of said transmitting element that has a predetermined relationship to said first level, wherein actuation of said second input device selectively overrides said first input device when actuated; and wherein said control returns the level of attenuation of said transmitting element too said first level upon deactuation of said second input device.

78. The light transmitting system in claim 77 wherein said element is a rearview mirror.

79. The light transmitting system in claim 77 wherein said element is a window.

* * * * *

UNITED STATES PATENT AND TRADEMARK OFFICE
CERTIFICATE OF CORRECTION

PATENT NO. : 5,148,014
DATED : September 15, 1992
INVENTOR(S) : Niall R. Lynam et al.

Page 1 of 3

It is certified that error appears in the above-identified patent and that said Letters Patent is hereby corrected as shown below:

Column 1, line 18:
  After "mirrors" insert --,--.

Column 1, lines 20 and 21:
  After "elements" insert --,--.

Column 1, line 32:
  After "adjustment" insert --,--.

Column 1, line 36:
  After "driver" insert --,--.

Column 1, line 41:
  After "functions" insert --,--.

Column 1, line 60:
  "known a" should be --known as--.

Column 2, line 12:
  "Unite" should be --United--.

Column 3, line 19:
  After "achievable" insert --,--.

Column 4, line 12:
  After "means" insert --,--.

Column 6, line 12:
  After "diagrams of" insert --vehicular--.

Column 6, line 62:
  After "mirrors" insert --,--.

Column 8, line 64:
  After "condition" insert --,--.

Column 9, line 15:
  After "levels" insert --,--.

UNITED STATES PATENT AND TRADEMARK OFFICE
CERTIFICATE OF CORRECTION

PATENT NO. : 5,148,014                       Page 2 of 3

DATED     : September 15, 1992

INVENTOR(S) : Niall R. Lynam et al

It is certified that error appears in the above-indentified patent and that said Letters Patent is hereby corrected as shown below:

```
Column 12, line 10:
   After "potentiometer 26" insert --.--.

Column 12, line 20:
   "74 and 7$" should be --74 and 75--.

Column 12, line 43:
   "Nos. 4,712,879" should be --No. 4,712,879--.

Column 13, line 32:
   After "switch 152" insert --.--.

Column 13, line 68:
   After "level" insert --.--.

Column 14, line 11:
   After "devices" insert --.--.
```

UNITED STATES PATENT AND TRADEMARK OFFICE
CERTIFICATE OF CORRECTION

PATENT NO. : 5,148,014
DATED : September 15, 1992
INVENTOR(S) : Niall R. Lynam et al It is certified that error appears in the above-indentified patent and that said Letters Patent is hereby corrected as shown below:

Column 14, line 14:
　After "busbars" insert --,--.

Column 14, line 37:
　"wit the" should be --with the--.

Column 14, line 38:
　After "devices" insert --,--.

Column 15, line 57, claim 2:
　"601%" should be --60%--.

Column 16, line 11, claim 8:
　"system ion" should be --system in--.

Signed and Sealed this

Twenty-eighth Day of December, 1993

Attest:

BRUCE LEHMAN

Attesting Officer

Commissioner of Patents and Trademarks